March 23, 1954 F. LICHTGARN 2,672,986
LIQUID FILTER
Filed March 16, 1949 3 Sheets-Sheet 1
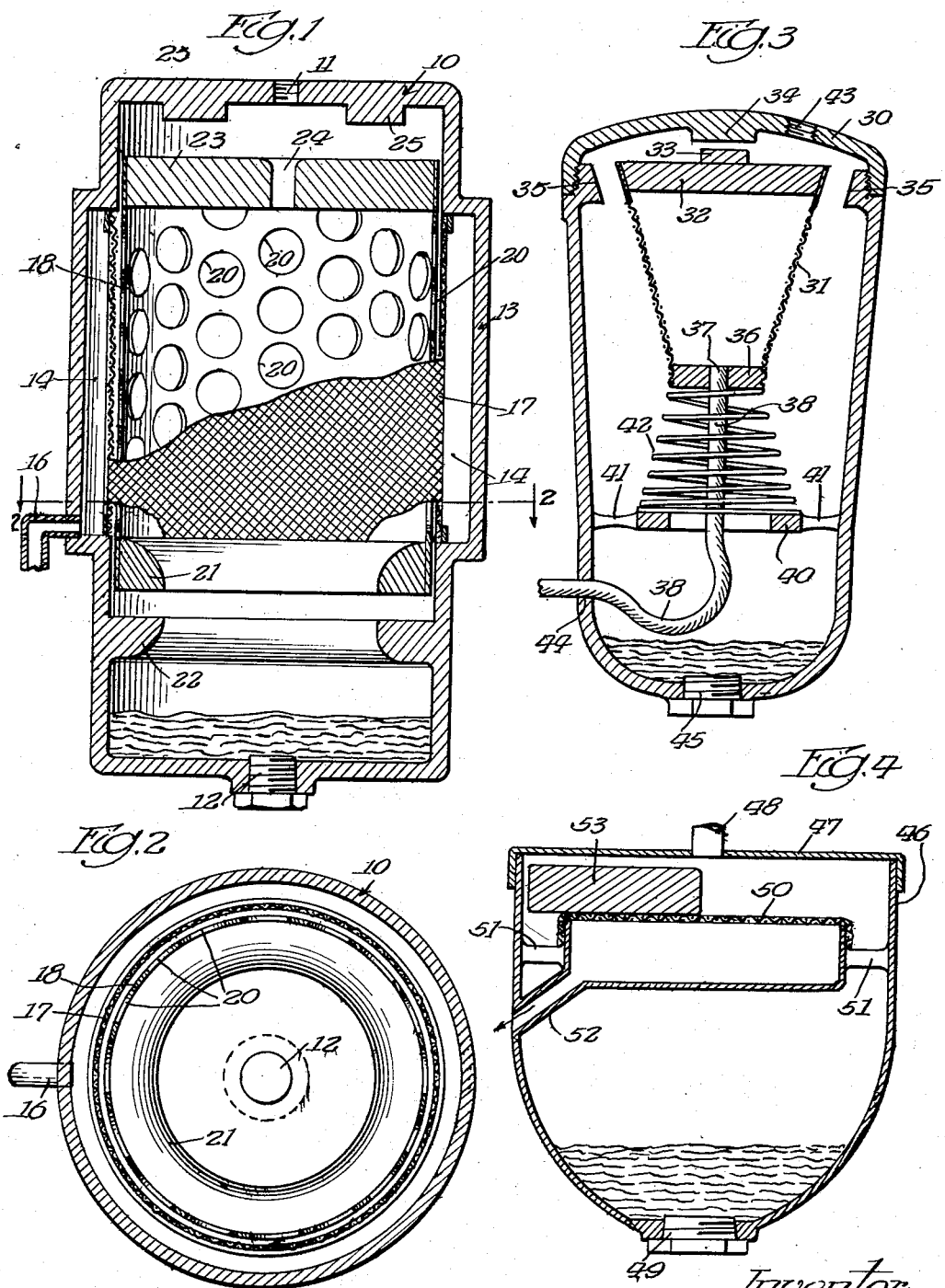
Inventor:
Fred Lichtgarn
By Kent W. Worrall Atty.

March 23, 1954 F. LICHTGARN 2,672,986
LIQUID FILTER
Filed March 16, 1949 3 Sheets-Sheet 2
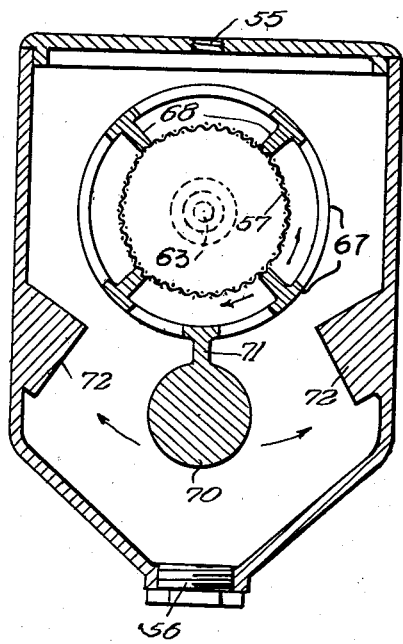
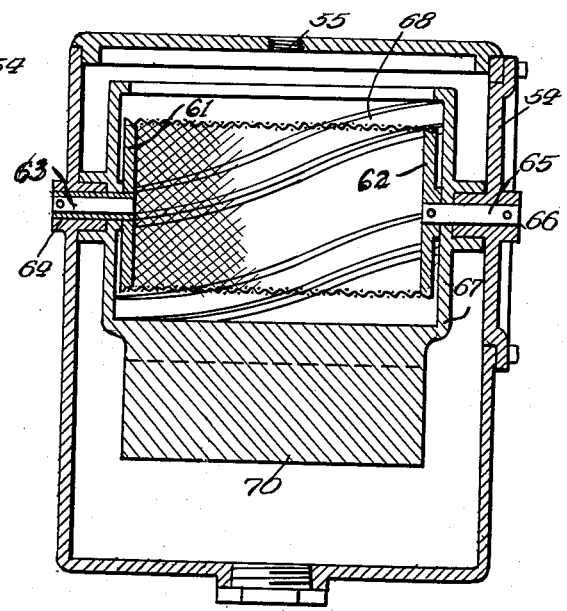
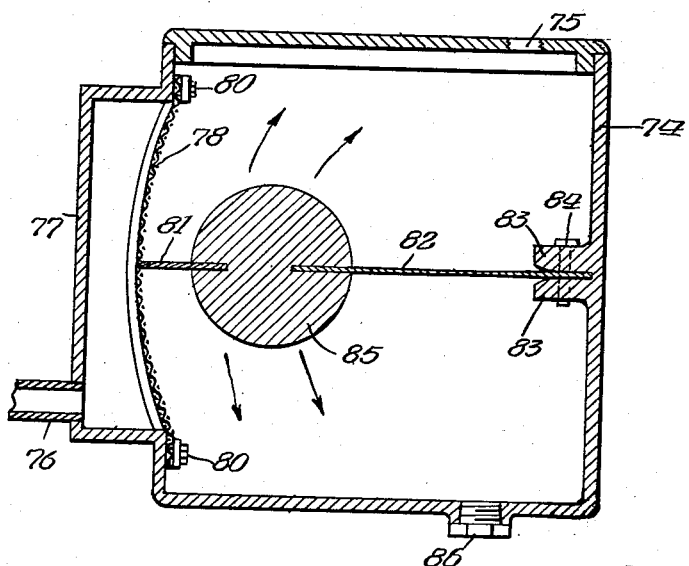
Inventor:
Fred Lichtgarn
By Kurt W. Wornell Atty.

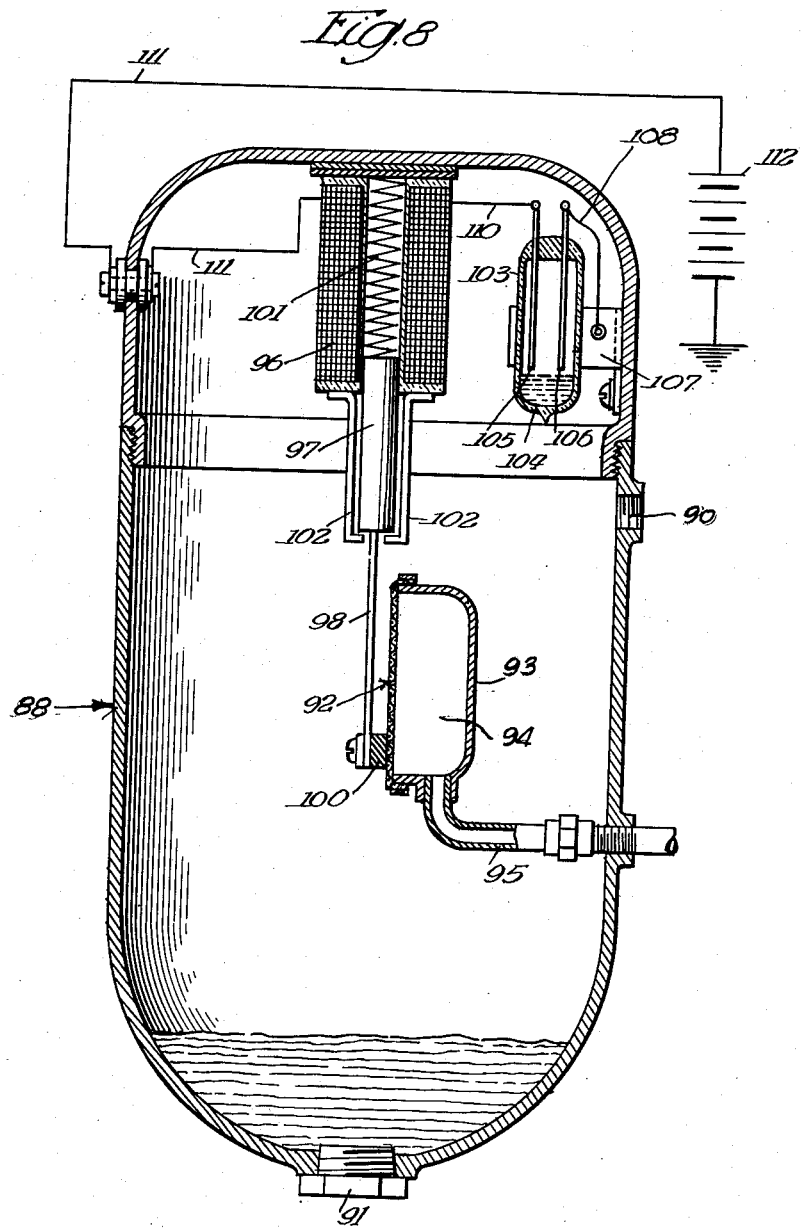

Patented Mar. 23, 1954

2,672,986

UNITED STATES PATENT OFFICE 2,672,986

LIQUID FILTER

Fred Lichtgarn, Chicago, Ill.

Application March 16, 1949, Serial No. 81,815

4 Claims. (Cl. 210—167)

This invention relates in general to a filter which may be used for fluids of all kinds, either gases, or liquids, but is more particularly described as a filter responsive to vibration or jarring for use in clarifying the lubricating oil of an internal combustion engine as particularly used for automotive vehicles.

An important object of the invention is to provide a filter having a screen through which liquid containing sludge, dirt and impurities is forced with movable means for engaging the filter surfaces to remove any accumulation thereon which does not pass readily through the screen.

A further object of the invention is to provide an oil filter having a screen and inertia contact means actuated by the movement of an engine to which it is applied for removing any accumulation of foreign material from the screen.

A further object of the invention is to provide a continuous liquid filter for automobile engines in which a screen through which the oil to be clarified must pass has a weighted means actuated by vibration or jarring for freeing the screen from an accumulation of foreign material on the screen, due to the jolting, jarring and other movements received by the automobile engine and the filter, as the engine is operated, and as the automobile is subjected to uneven movements in passing along the ground or the highways.

A further object of the invention is to provide a filter in which a relatively fixed screen is engaged by a contact member actuated by relative movements thereof in passing over and upon the screen to wipe accumulated foreign materials therefrom which do not pass through the screen and thereby continuously maintaining the filtering capacity of the screen.

Other objects of the invention will appear in the specification and will be apparent from the accompanying drawings, in which, Fig. 1 is a sectional view of a filter in accordance with this invention in which a circular screen has a circular wiper located therein and the wiper is movable with respect to the screen due to any relative movements thereof;

Fig. 2 is a sectional view taken on the line 2—2 of Fig. 1;

Fig. 3 is a sectional view of an inertia filter mounted in a casing upon a spring support and relatively movable in the casing to disengage particles from the outside of the screen;

Fig. 4 is a sectional view of a filter having a casing with a relatively fixed screen element therein and a wiper held in place by the casing and movable upon the surface of the screen for disengaging accumulations of dirt or foreign material therefrom;

Figs. 5 and 6 are sectional views at right angles to each other of another form of inertia wiper comprising a circular screen mounted upon a horizontal axis and a wiper therefor having spiral blades for mounting it upon the screen and a weight for moving it in opposite directions to contact fixed projections as the filter is jolted, thereby disengaging foreign material from the screen;

Fig. 7 is another form of inertia wiper, comprising an arcuate screen and a pivoted and weighted wiper for engaging one surface of the screen and wiping it clear of materials due to oscillations of the weighted wiper in the casing; and Fig. 8 is a sectional view of a filter of the inertia type having a wiper movable over a screen and actuated by an electro-magnetic device which receives current through a switch of the splash type in which the switch is closed due to a sufficient agitation of the filter casing.

In the present type of filters commonly used for internal combustion engines and automobiles, the used oil is delivered to the filter which usually has a stationary screen or a filtering unit through which the oil to be cleaned must pass. In a short time, all of the filtering surface is covered with foreign material which so clogs the screens or filtering materials that it is necessary to by-pass the bulk of the oil, the filter being of no effect. The present invention differs entirely from this type of filter by providing a screen which may be fixed or movable, but to which is applied a jolt or a movable member actuated by the movement of a vehicle in which the engine is positioned so that the filtering surface is wiped or cleared from any accumulation of filtrate which does not pass through the screen, the foreign matter thus removed is collected at the bottom of the filter casing and may be easily removed periodically therefrom.

The number of forms of filters embodying these ideas of inertia and movement of the filter are illustrated in the drawings to show the various forms of the invention for accomplishing the desired result.

Referring now more particularly to the drawings, a casing 10 as shown in Figs. 1 and 2 has an inlet 11 at the top for receiving oil to be filtered, and a draw-off opening with a plug 12 therefore at the bottom. Intermediate the ends of the casing is an outwardly offset enlargement 13 to provide a clean oil space 14 having a draw-off pipe 16 at the bottom thereof. A filter screen 17 is mounted flush with the remainder of the inner wall of the casing forming a partition for dividing the clean oil space 14 from the remainder of the interior of the casing. In this form, the casing and the other parts are circular, but they may also be square or any other suitable shape.

Mounted and movable within the casing and fitting closely against the inside of the screen 17 is a scraper 18 of thin sheet metal or the like having a plurality of relatively large openings 20 which extend throughout the surface of the scraper. At the bottom of the scraper is an inner supporting ring 21 adapted to engage and rest upon an internal rib 22 formed in the casing below the location of the screen 17. Secured in the top of the scraper is a weighted disc 23 having a central opening 24 to admit lubricant to the interior of the scraper and thence through the holes 20 to the screen 17. Extending inwardly from the upper wall of the scraper are projections 25 adapted to engage the weight 23 when it is moved upwardly in the casing.

In operation, the oil containing impurities is admitted through the opening 11 and passes downwardly in the casing through the opening 24 in the top weight 23 filling the casing. If the oil is under pressure, it will pass through the screen 17 and outwardly through the discharge pipe 16, the scraper being partially supported by the oil in the casing but moving freely up and down as the casing is jolted and moved during the ordinary movements of an automobile engine and the like to which it is applied. The movements of the scraper up and down in the casing will wipe any accumulation of dirt or foreign material from the inner surface of the screen 17, the material passing inwardly through the openings 20 and dropping to the bottom of the casing. As the scraper is jolted up and down, the impact of the ring 21 with the rib 22 at its downward end of movement will cause many foreign particles to be jolted loose from the inside of the scraper and the upward movement of the scraper which engages the weight 23 with the projection 25 will have the same effect. Thus the scraper continuously clears the surface of the screen keeping it clean and dislodging foreign material therefrom. The openings 20 will afford sufficient filtering area so that if the casing is comparatively still, receiving no jolts or impacts for a short time, the capacity of the filter will be sufficient to maintain the filter in operation.

In the form shown by Fig. 3, the casing 30 has a cylindrical filter screen 31 preferably frustoconical in shape with a weight 32 at the top and a central projection 33 spaced opposite a central projection 34 in the top of the casing. Near the top is an inwardly projecting rib 35 the inner surface of which is inclined to conform to the inclination of this end of the filter screen and its top weight 32. Secured in the bottom of the filter screen is a base member 36 having an outlet 37 therethrough to which a flexible pipe 38 is connected. Below the filter screen is a support 40 suitably connected to the walls of the casing by spaced arms 41 and between the support and the base member 36 is a spiral supporting spring 42 which holds the screen normally in position with the top of the screen substantially within the rib 35. At the top of the casing 30 is an inlet opening 43 and near the bottom is an outlet opening 44 through which the flexible pipe 38 extends but leaving a sufficient loop of the pipe within the casing so that the filter screen is free to move therein. At the bottom of the casing is a drain plug 45.

With this construction, the oil to be filtered fills up the casing, passes through the screen 31 and outwardly through the pipe 38. Any impurities in the oil will collect upon the outer conical surface of the screen and will drop freely therefrom upon impact of the upper resiliently supported screen with the contact ring 35 or the projection 34. The filtrate will pass to the bottom of the casing and may be discharged therefrom by removing the plug 45.

In the form of the invention shown by Fig. 4, a casing 46 has a removable top 47 with a central inlet 48 therethrough and at the bottom of the casing is an opening and a draw-off plug 49. Within the casing is a hollow filter unit 50 preferably circular in shape and of material thickness suitably supported by spaced arms 51 from the interior of the casing. Extending from one side of the filter unit is a discharge connection 52 which extends outwardly through the wall of the casing.

Mounted on top of the filter unit 50 and freely movable in the casing is a scraper 53 which acts as a wiper for any material lodged on top of the filter unit, the movements of the scraper due to any jolting or movement of the filter being effective to project or move the accumulation of foreign material from the top of the filter unit and discharge it over the outer edge thereof. The filtering element may also extend over the bottom of the unit, but any accumulation of dirt will not remain on the bottom but will be jolted loose and discharged to the bottom of the casing without any necessity for a wiper.

In the form of the invention shown by Figs. 5 and 6, a casing 54 has a top inlet 55 and a bottom discharge opening for sludge and dirt closed by a drain plug 56. Within the casing is a cylindrical screen unit 57 mounted upon end discs 61 and 62. One disc has a central supporting pipe 63 extending through a bearing 64 to the outside of the casing and the other disc 62 has a short supporting shaft 65 secured to a bearing 66.

Also mounted on the bearings 64 and 66 at the ends of the discs 61 and 62 are rotatable end supports 67 for wipers 68 which extend inwardly toward each other and spirally with respect to the outer surface of the cylindrical screen 57. To the lower sides of the end supports 67 is a weight 70 supported by a continuous rib 71 which extends between the end pieces.

Projecting inwardly from opposite walls of the casing and in the arc of movement of the weight 70 are bumpers 72. With this construction, oil to be filtered is applied to the casing through the opening 55; it passes through the filter unit 57 and outwardly therefrom through the discharge 63. Any accumulation of foreign material on the exterior surface of the filter unit is dislodged therefrom by the spiral wipers 68 whenever the wiper unit is sufficiently agitated to swing upon its bearings or to engage the bumper 72.

Another inertia type of wiper is illustrated in Fig. 7 and comprises a casing 74 with a top fill opening 75 and a discharge pipe 76 extending from an offset projection 77. Mounted over the projection 77 is a flat filter screen 78 arranged in the arc of the circle and the ends secured to the casing by suitable fastening means 80. A wiper 81 is movable over the arc of this screen by mounting it in connection with one end of a flexible blade or plate 82 connected in projections 83 by fastening means 84 so that the wiper 81 will swing back and forth upon the arc of the screen 78 wiping any accumulation of dirt or foreign material therefrom. To assist the movement of the wiper, a weight 85 may be interposed between the wiper 81 and the flexible blade 82. Any accumulation of dirt or sediment in the casing may be removed from the bottom thereof by the removal of a fill plug 86.

In the form of the invention shown by Fig. 8, a casing 88 has an inlet 90 and a sludge draining opening closed by a drain plug 91. A flat type of filter 92 is rigidly mounted by a support 93 forming therewith a clean oil chamber 94 connected by a discharge pipe 95 extending therefrom through the wall of the casing. This filtering unit is actuated by electro-magnetic means comprising an electro-magnet 96 having an armature 97 with an arm 98 extending therefrom and supporting a wiper 100 normally contacting horizontally with a portion of the filter screen 92. The armature 97 is preferably pushed downwardly by a light spring 101 and this movement is restrained or limited by brackets 102 which engage the armature, but the movement of the armature is sufficient so that the wiper 100 will engage the entire surface of the screen 92 when the armature is moved. To actuate the armature, a mercury splash switch may be provided located within the casing if desired and comprising a tubular container 103 with mercury 104 at the bottom thereof and spaced conductors 105 and 106 located normally above the surface of the mercury. The switch may be suitably supported within the casing upon a bracket 107 to which one of the conductors 106 is grounded by means of a conductor 108. Another conductor 110 extends from the other contact 105 to one terminal of the magnet winding 96 and another conductor 111 extends from the other terminal of the magnet winding through the casing and to one side of a battery 112, the other side of which is grounded in accordance with automobile practice.

With this construction, the movement of the wiper is dependent somewhat upon the closing of the switch connections although a jolting of the armature of the magnet will also cause a limited movement of the wiper over the surface of the screen. When the switch is sufficiently agitated to make connection between the conductors 105 and 106, an energizing circuit will be closed for the magnet winding through the battery which will draw the armature upwardly, thereby moving it over the upper portion of the screen. The periodic opening and closing of the switch in this manner will cause the wiper 100 to move over the entire surface of the screen discharging any accumulation of the dirt therefrom.

In these forms of the invention, the foreign materials which do not pass through the screen are wiped, shaken, or moved from the screen due to the impact or relative inertia movement of the screen and some member which engages the screen. In any of the forms but the electrically operated one, no additional power is required nor is there any connection with the engine so that no power is taken therefrom, the operation of the filter depends upon the impact, contact, or movement of some weighted part which is connected to a wiper moved over the filter surface by inertia and vibration of the parts, thereby cleaning the surface and removing the foreign material therefrom in the manner described.

While several variations of the invention have been shown and described, they should be regarded by way of illustration or example rather than as a restriction or limitation of the invention since various changes may be made in the construction, combination and arrangement of the parts without departing from the spirit and scope of the invention.

I claim:

1. In clarifying lubricating oil, the method of automatically self-cleaning an oil filter screen of its adherent mass of sticky residue which comprises physically impelling the residue by a weight member movable due to vibration along and parallel to the surface of the screen and progressively moving the residue in contact with the screen until it is discharged therefrom.

2. In an automatically self-cleaning oil filter attached to a variably movable structure, a closed filter casing with an inlet and an outlet shaped to provide a sediment collector in the bottom portion of the casing, screening means secured in the casing spaced from the wall thereof and provided with a filtrate chamber connected to the outlet above said sediment collector, and weighted means resting freely on the screen and slidably movable thereon to clean it due to the movement of the casing.

3. An oil filter in accordance with claim 2, in which the area of the screen is less than the transverse area of the casing providing a space between the screen and the casing, and the weighted means is less in area than the area of the screen for sliding movement thereon and sufficiently large in size to prevent it from moving downwardly in the space between the outer edge of the screen and the inside of the casing.

4. In an automatically self-cleaning oil filter attached to a variably movable structure, a closed filter casing with an inlet and an outlet shaped to provide a sediment collector on the bottom portion, screening means in the casing between the inlet and the outlet above the sediment collector, a flexibly mounted weighted member secured to the casing opposite the screen carrying a blade in contact with the screen and movable along the screen in response to vibrations and operative to progressively move residue along the engaged surface of the screen and remaining in continuous sliding contact with the surface until discharged by the wiper from the screen.

FRED LICHTGARN.

References Cited in the file of this patent

UNITED STATES PATENTS

| Number | Name | Date |
|---|---|---|
| 192,313 | Watson | June 19, 1877 |
| 580,561 | Stephenson | Apr. 13, 1897 |
| 1,130,725 | Getts | Mar. 9, 1915 |
| 1,331,900 | Cartwright | Feb. 20, 1920 |
| 1,741,444 | Slider et al. | Dec. 31, 1929 |
| 2,066,479 | MacIsaac | Jan. 5, 1937 |
| 2,083,148 | Coulombe | June 8, 1937 |
| 2,475,561 | Cooperider et al. | July 5, 1949 |

FOREIGN PATENTS

| Number | Country | Date |
|---|---|---|
| 338,179 | Germany | Feb. 27, 1920 |